United States Patent
Pan et al.

(10) Patent No.: US 11,611,134 B2
(45) Date of Patent: Mar. 21, 2023

(54) BATTERY AND BATTERY APPARATUS

(71) Applicant: CALB CO., LTD., Jiangsu (CN)

(72) Inventors: Fangfang Pan, Changzhou (CN); Jiuling Xu, Changzhou (CN); Binwei Qi, Luoyang (CN); Yongjie Zhang, Luoyang (CN)

(73) Assignee: CALB CO., LTD., Jiangsu (CN)

( * ) Notice: Subject to any disclaimer, the term of this patent is extended or adjusted under 35 U.S.C. 154(b) by 0 days.

(21) Appl. No.: 17/372,489

(22) Filed: Jul. 11, 2021

(65) Prior Publication Data

US 2022/0367995 A1  Nov. 17, 2022

(30) Foreign Application Priority Data

May 14, 2021 (CN) .................. 202110528873.X (51) Int. Cl.
    *H01M 50/627* (2021.01)
    *H01M 50/502* (2021.01)
    *H01M 50/102* (2021.01)

(52) U.S. Cl.
    CPC ....... *H01M 50/627* (2021.01); *H01M 50/102* (2021.01); *H01M 50/502* (2021.01)

(58) Field of Classification Search
    None
    See application file for complete search history.

(56) References Cited

U.S. PATENT DOCUMENTS

| 10,930,978 | B2 | 2/2021 | Drews et al. |
| 2012/0114987 | A1 | 5/2012 | Kogure et al. |
| 2012/0214032 | A1 | 8/2012 | Franklin et al. |
| 2021/0036379 | A1 | 2/2021 | Zhou et al. |
| 2021/0126293 | A1 | 4/2021 | Wang et al. |

FOREIGN PATENT DOCUMENTS

| CN | 106229439 | 2/2019 |
| CN | 111403822 | 7/2020 |
| DE | 102007012693 | 9/2008 |
| DE | 102013220957 | 4/2015 |
| GB | 225719 | 12/1924 |
| KR | 20060108113 | 10/2006 |
| KR | 20110082966 | 7/2011 |

OTHER PUBLICATIONS

"Search Report of Europe Counterpart Application", dated Jan. 18, 2022, p. 1-p. 16.

*Primary Examiner* — Carmen V Lyles-Irving
(74) *Attorney, Agent, or Firm* — JCIP Global Inc.

(57) ABSTRACT

The disclosure relates to a technical field of batteries, and a battery and a battery apparatus are provided. The battery includes a cell, and the cell includes a cell body and tab portions. Each of the tab portions extends from one side of the cell body. The battery further includes a housing. The housing is a hollow structure, and the hollow structure is formed inside the housing. The cell is disposed in the housing, and the housing includes a first surface and a second surface opposite to each other. The first surface is provided with liquid injecting holes, and the liquid injecting holes penetrate the first surface and do not penetrate the second surface. An orthographic projection of the cell body on the first surface does not overlap the liquid injecting holes.

18 Claims, 7 Drawing Sheets

BATTERY AND BATTERY APPARATUS

CROSS-REFERENCE TO RELATED APPLICATION

This application claims the priority of China patent application serial no. 202110528873.X, filed on May 14, 2021. The entirety of the above-mentioned patent application is hereby incorporated by reference herein and made a part of this specification.

BACKGROUND

Technical Field

The disclosure relates to a technical field of batteries, and in particular, to a battery and a battery apparatus.

Description of Related Art

A battery includes a housing and a cell. The cell is disposed in the housing, and the cell is provided with an anode tab and a cathode tab. The anode tab and the cathode tab are connected to the anode and cathode posts on the housing through the electrode connecting sheets. Electrolyte injection is an important part in the battery preparation process. At present, liquid injecting holes are usually provided on the housing to complete the liquid injecting process. However, in the related art, when the electrolyte enters the housing through the injecting hole, the electrode sheets of the cell are impacted most of the time, and overall performance of the battery is thus affected.

The above-mentioned information disclosed in the BACKGROUND section is only used to strengthen the understanding of the background of the disclosure, and therefore it may include information that does not constitute the prior art known to a person having ordinary skill in the art.

SUMMARY

According to the first aspect of the disclosure, a battery is provided, and the battery includes a cell and a housing.

The cell includes a cell body and tab portions, and each of the tab portions extends from one side of the cell body.

The cell is disposed in the housing. The housing includes a first surface and a second surface opposite to each other, the first surface is provided with liquid injecting holes, and the liquid injecting holes penetrate the first surface and do not penetrate the second surface. An orthographic projection of the cell body on the first surface does not overlap the liquid injecting holes.

According to the second aspect of the disclosure, a battery apparatus is provided, and the battery apparatus includes the battery described in the first aspect.

The battery provided by the disclosure includes the cell and the housing. The cell includes the cell body and the tab portions. The housing is provided with the liquid injecting holes. Further, the orthographic projection of the cell body on the first surface does not overlap the liquid injecting holes. When liquid injection is performed, an electrolyte enters the housing through the liquid injecting holes, and the orthographic projection of the cell body on the first surface and the liquid injecting holes do no overlap.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure aims to provide a battery and a battery apparatus capable of preventing a cell body from being impacted and damaged during liquid injection, and that a good liquid injecting effect is provided, and comprehensive performance of the battery is improved.

Figure 1:
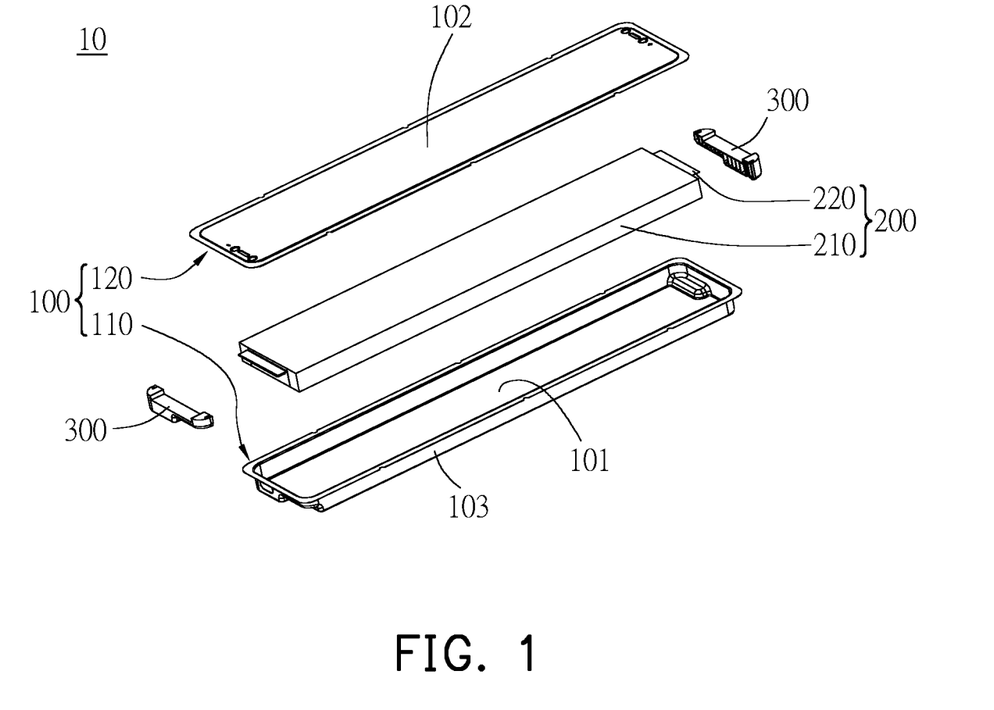
FIG. 1 is an exploded view of a battery according to an exemplary embodiment of the disclosure.

As shown in FIG. 1, in the embodiments of the disclosure, a battery 10 including a cell 200 and a housing 100 is included. The cell 200 includes a cell body 210 and tab portions 220, and each of the tab portions 220 extends from one side of the cell body 210. The cell 200 is disposed in the housing 100. The housing 100 includes a first surface 101 and a second surface 102 opposite to each other. The first surface 101 is provided with liquid injecting holes 130, and the liquid injecting holes 130 penetrate the first surface 101 and do not penetrate the second surface 102. An orthographic projection of the cell body 210 on the first surface 101 does not overlap the liquid injecting holes 130.

The battery 10 provided by the disclosure includes the cell 200 and the housing 100. The cell 200 includes the cell body 210 and the tab portions 220. The housing 100 is provided with the liquid injecting holes 130, and the orthographic projection of the cell body 210 on the first surface 101 does not overlap the liquid injecting holes 130. When liquid injection is performed, an electrolyte enters the housing 100 through the liquid injecting holes 130. Since the orthographic projection of the cell body 210 on the first surface 101 and the liquid injecting holes 130 do no overlap, the cell body 210 may not be impacted by entry of the electrolyte. As such, the cell body 210 is effectively prevented from being impacted and damaged, a good liquid injecting effect is provided, and comprehensive performance of the battery 10 is improved.

Components of the battery 10 provided by the embodiments of the disclosure are described in detail in combination with accompanying drawings.

Figure 2:
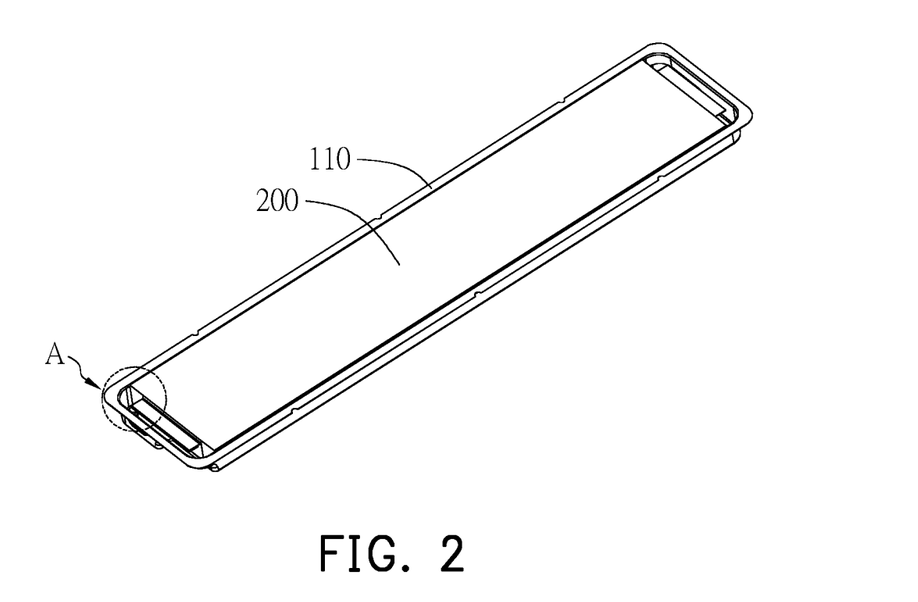
FIG. 2 is a schematic view of a structure of arrangement of a cell in a housing according to an exemplary embodiment of the disclosure.
Figure 3:
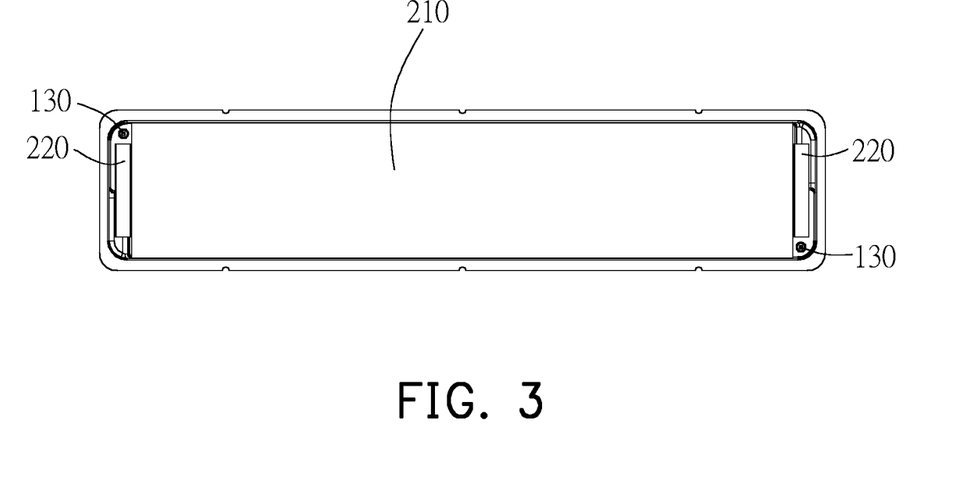
FIG. 3 is a top view of FIG. 2.

As shown in FIG. 1 to FIG. 3, the battery 10 includes the cell 200 and the housing 100, and the cell 200 is disposed in the housing 100. Herein, the cell 200 includes the cell body 210 and the tab portions 220, and each of the tab portions 220 extends from one end of the cell body 210. The housing 100 includes the first surface 101 and the second surface 102 opposite to each other. The first surface 101 is provided with the liquid injecting holes 130, and the liquid injecting holes 130 penetrate the first surface 101 and do not penetrate the second surface 102. The orthographic projection of the cell body 210 on the first surface 101 does not overlap the liquid injecting holes 130.

In some embodiments of the disclosure, the housing 100 generally has a cube structure, and a shape and a size of the housing 100 may be set according to actual needs of the battery 10. In addition, the housing 100 may also be configured to include other structures, such as an electrode post structure including an anode post and a cathode post. The first surface 101 may be a bottom surface or a side surface of the housing 100. The liquid injecting holes 130 may be disposed on the bottom surface or the side surface of the housing 100, as long as the orthographic projection of the cell body 210 on the first surface 101 and the liquid injecting holes 130 do not overlap.

In some embodiments of the disclosure, the cell 200 is disposed in the housing 100, the cell 200 includes the cell body 210 and the tab portions 220, and each of the tab portions 220 extends from one side of the cell body 210. The cell 200 is formed by an anode sheet, a separator, and a cathode sheet stacked in sequence. The tab portions 220 include an anode tab portion and a cathode tab portion. The anode tab portion is formed on the anode sheet, and the cathode tab portion is formed on the cathode sheet. In a preferred embodiment, the cell 200 is formed by the anode sheet, the separator, and the cathode sheet stacked in sequence in a zigzag shape.

Figure 8:
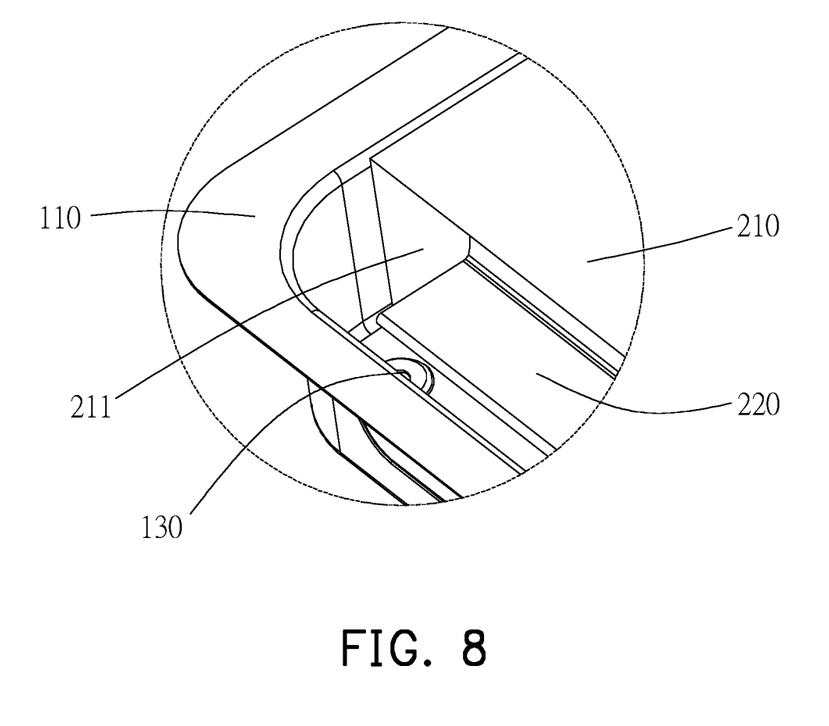
FIG. 8 is an enlargement view of portion A in FIG. 2.

In some embodiments of the disclosure as shown in FIG. 2, FIG. 3, and FIG. 8, each of the tab portions 220 extends from one side of the cell body 210, and a central axis of each of the liquid injecting holes 130 is parallel to a tab portion extending surface 211 of the cell body 210. In the disclosure, the central axis of each of the liquid injecting holes refers to an axis perpendicular to a plane where the liquid injecting hole 130 is located and passing through a center of the liquid injecting hole 130. When liquid injection is performed, the electrolyte generally generates a certain impact force in a direction of the central axis of the liquid injecting hole 130. In the disclosure, the central axis of each of the liquid injecting holes 130 is parallel to the tab portion extending surface 211 of the cell body 210. This means that the impact force generated during liquid injection is also parallel to the tab portion extending surface 211 of the cell body 210. The impact force may not directly face a plane where electrode sheets of the cell 200 are located and thus may not impact on and damage the electrode sheets, and in this way, a good liquid injecting effect and a favorable pass rate of the battery 10 are provided.

Figure 4:
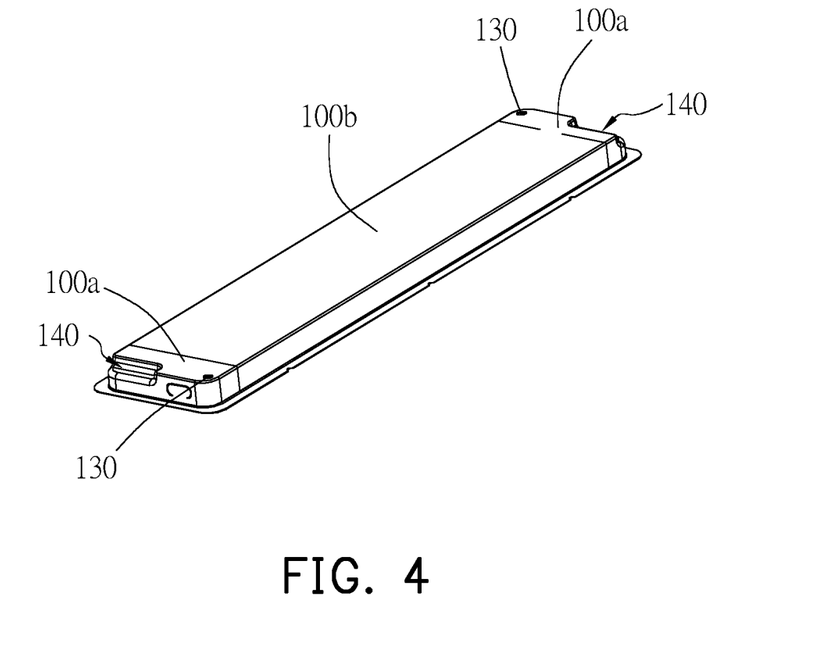
FIG. 4 is a schematic view of a structure of the housing according to an exemplary embodiment of the disclosure.

As shown in FIG. 1 and FIG. 4, in some embodiments of the disclosure, an internal space of the housing 100 includes a cell body accommodating zone and tab portion accommodating zones. The cell body accommodating zone is configured to accommodates the cell body 210, and the tab portion accommodating zones are configured to accommodate the tab portions 220. The housing 100 includes a cell body section 100b and tab portion sections 100a. Each of the tab portion sections 100a is located on one side of the cell body section 100b, and the cell body section 100b surrounds and forms the cell body accommodating zone. The tab portion sections 100a surround and form the tab portion accommodating zones, and the liquid injecting holes 130 are disposed on the tab portion sections 100a. In some embodiments, a number of the tab portion accommodating zones is two, and the tab portion accommodating zones are located on two sides of the cell body accommodating zone. The liquid injecting holes 130 are disposed on the tab portion sections 100a corresponding to the tab portion accommodating zones, and the tab portion accommodating zones may provide certain spaces for the electrolyte to make entry during liquid injection, so the electrode sheets may be less affected.

As shown in FIG. 1, FIG. 3, FIG. 4, and FIG. 13, in some embodiments of the disclosure, the liquid injecting holes 130 are disposed at corners of the first surface 101. Junctions of first sides 1011 and second sides 1012 of the first surface 101 form the corners. In some embodiments, the junctions of the first sides 1011 and the second sides 1012 are approximately right angles, and in some other embodiments, the junctions of the first sides 1011 and the second sides 1012 are rounded. The liquid injecting holes 130 are away from central axes of the first sides 1011 and central axes of the second sides 1012 of the first surface 101, and gaps are provided between hole edges of the liquid injecting holes 130 and edges of the first surface 101 forming the corners. To be specific, a length of each of first sides 1011 forming each of the corners is a, and a length of each of second sides 1012 forming each of the corners is b. A distance between each of the liquid injecting holes and each of the second sides 1012 is h1, and a distance between each of the liquid injecting holes and each of the first sides 1011 is h2, where a≥b, $\frac{1}{600}a \leq h1 \leq \frac{1}{25}a$, and $\frac{1}{100}b \leq h2 \leq \frac{1}{5}b$. In some specific embodiments, a value of each of h1 and h2 is 1 mm to 20 mm. The corners of the first surface 101 have strong structural strength, so that less deformation may be generated during a process of forming the liquid injecting holes 130. In addition, in a liquid injecting process, the electrolyte may be conveniently injected and sealed after liquid injection.

In some embodiments of the disclosure, a number of the liquid injecting holes 130 is two, and the two liquid injecting holes are diagonally arranged. To be specific, one of the liquid injecting holes 130 is disposed at a first corner of the first surface 101, and the other liquid injecting hole 130 is disposed at a second corner of the first surface 101. The first surface and the second surface are diagonally arranged. In the disclosure, with the diagonal arrangement of the two liquid injecting holes 130, on the one hand, liquid injection efficiency is improved, and on the other hand, a favorable wetting effect is provided by the electrode sheets of the cell.

As shown in FIG. 1 and FIG. 4, in some embodiments of the disclosure, the housing 100 includes the first surface 101 and the second surface 102 opposite to each other and further includes four third surfaces 103 surrounding around the first surface 101 and the second surface 102. The first surface 101, the second surface 102, and the third surfaces 103 form the housing 100. An area of the first surface 101 is greater than an area of each of the third surfaces 103. That is, the first surface 101 is the large surface of the housing 100, and as the liquid injecting holes 130 are disposed on the large surface of the housing 100 and the large surface may facilitate shaping, process difficulty is thus reduced. Preferably, the housing 100 may substantially exhibit a cuboid structure. When the housing 100 is substantially shaped as a cuboid, the cuboid is flat.

Figure 12:
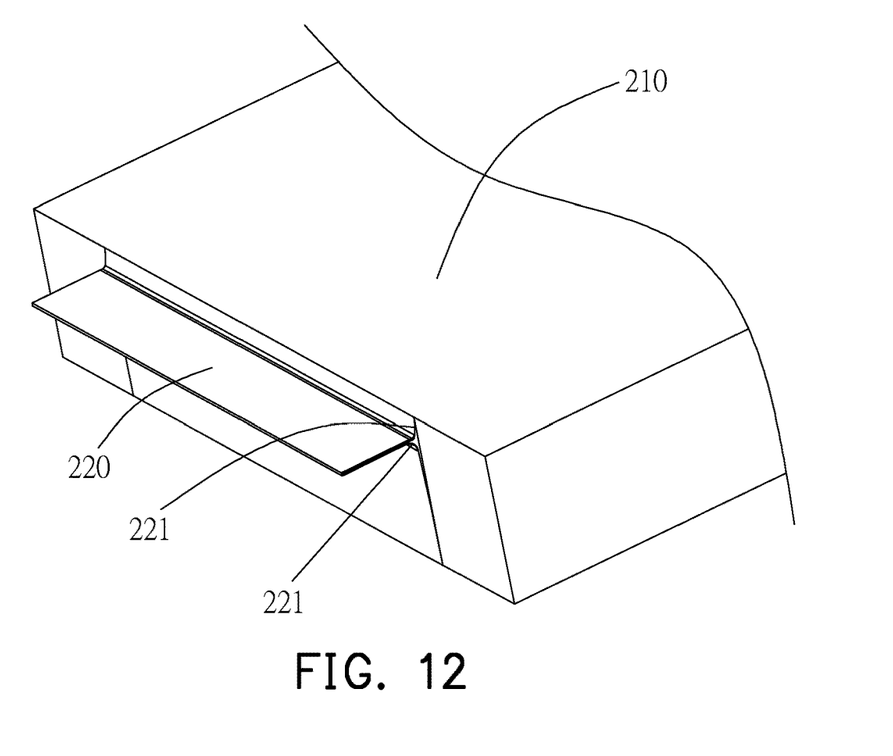
FIG. 12 is a schematic view of a structure of extension of tab portions from a cell body according to an exemplary embodiment of the disclosure.
Figure 13:
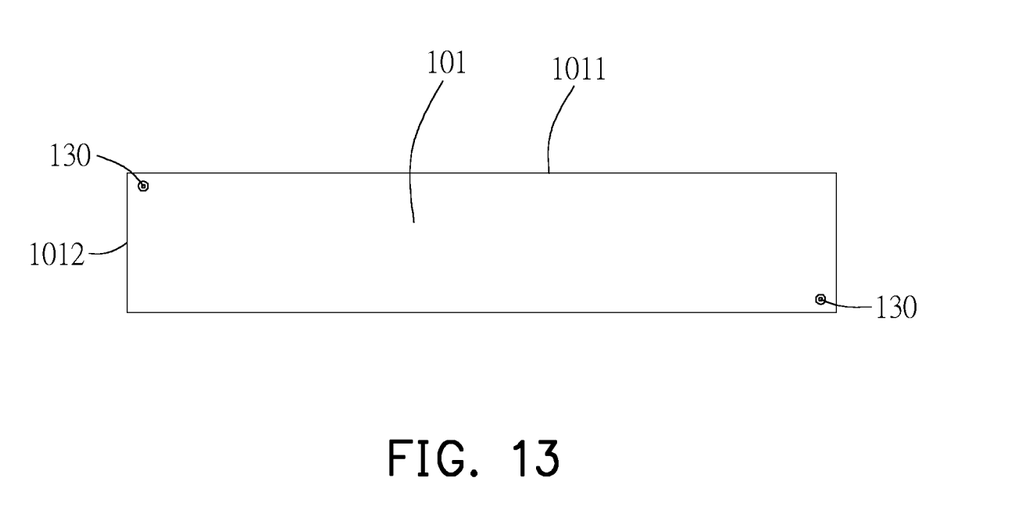
FIG. 13 is a planar graph of a first surface in the housing according to an exemplary embodiment of the disclosure.

As shown in FIG. 1 and FIG. 12, in some embodiments, each of the tab portions 220 includes two or more single tabs 221 extending from a side surface of the cell body 210. An overlapping direction of the single tabs 221 is a first direction when the single tabs 221 are flattened in a direction perpendicular to the side surface of the cell body 210. The first surface 101 is one of the opposite two surfaces of the housing 100 in the first direction. In this embodiment, the liquid injecting holes 130 are disposed on the first surface 101. When the electrolyte enters the housing 100 through the liquid injecting holes 130, an injecting direction of the electrolyte is substantially parallel to the first direction. The electrolyte injected in this direction may not generate an impact force on a side surface formed by stacking of the single tabs 221, so that damage to the tab portion 220 is thus lowered. In a preferred embodiment, orthographic projections of the single tabs 221 on the first surface 101 do not overlap the liquid injecting holes 130. In the embodiment, the injecting direction of the electrolyte is not straight to the single tabs 221 and may not impact on the single tabs 221, so that the tab portions 220 are effectively prevented from being damaged.

In some specific embodiments, the housing 100 includes a bottom housing 110 and a top cover 120. The bottom housing 110 includes a bottom wall and a side wall connected to the bottom wall, and the bottom housing and the side wall form a hollow structure with a top opening. The top cover 120 is hermetically connected to the top opening of the bottom housing 110. The bottom wall of the bottom housing 110 forms the first surface 101 of the housing 100, and an area of the bottom wall is greater than that of the side wall. A top wall of the top cover 120 forms the second surface 102 of the housing 100. The top cover 120 and the bottom housing 110 may be connected by welding or gluing, which is not particularly limited by the disclosure. Note that the housing 100 may also have other structures. For instance, the housing 100 may also exhibit a cuboid structure including a bottom housing and a side cover. The bottom housing is a space structure having a side end opening, a bottom wall and a top wall of the bottom housing is the first surface 101 and the second surface 102 of the housing 100, and the side cover is connected to the side end opening of the bottom housing. In a preferred embodiment, the housing 100 includes the bottom housing 110 and the top cover 120. In such a structural housing 100, the cell 200 may be conveniently assembled, and the cell 200 may not be easily damaged during the assembly process.

As shown in FIG. 1, in some embodiments of the disclosure, the battery 10 further includes holders 300. The holders 300 are disposed in the housing 100, and each of the holders 300 are located on one side of the cell body 210. The holders support between the first surface 101 and the second surface 102 of the housing 100 and are located between an end side surface of the housing 100 and the tab portion extending surface 211 of the cell body 210. In some embodiments of the disclosure, a number of the holders 300 is two, and the holders 300 are located on two sides of the cell body 210. The two holders 300 stably secure the cell body 210 in the housing 100. The holders 300 support between the first surface 101 and the second surface 102 of the housing 100. In some specific embodiments, partial surfaces of the holders 300 abut between the first surface 101 and the second surface 102 of the housing 100 to support the housing 100 and to maintain stability of the first surface 101 and the second surface 102.

As shown in FIG. 5 to FIG. 7 and FIG. 9 to FIG. 11, in some embodiments of the disclosure, each of the holders 300 is provided with a liquid inlet hole 331 and a liquid inlet channel 320, and a projection of the liquid inlet hole 331 on the first surface 101 at least partially overlaps the liquid injecting hole 130. A portion of the holder 300 provided with the liquid inlet hole 331 abuts against the first surface 101, and one end of the liquid inlet channel 320 communicates with the liquid inlet hole 331. When liquid injection is performed, a liquid injecting nozzle of a liquid injecting device is required to be inserted into the liquid injecting hole to be in close contact with the housing 100. The electrolyte may directly enter the cell 200 through the liquid inlet channel 320 after passing through the liquid injecting hole 130 and the liquid inlet hole 331. A portion of the holder 300 provided with the liquid inlet hole 331 abuts against the first surface 101. In this way, deformation of the housing 100 which may affect sealing of the battery during the liquid injection process is prevented from occurring, and liquid splitting is also prevented from occurring before the electrolyte enters the liquid inlet hole 331, as such, the electrolyte may smoothly enter the cell 200 and wets the electrode sheets of the cell 200.

Figure 9:
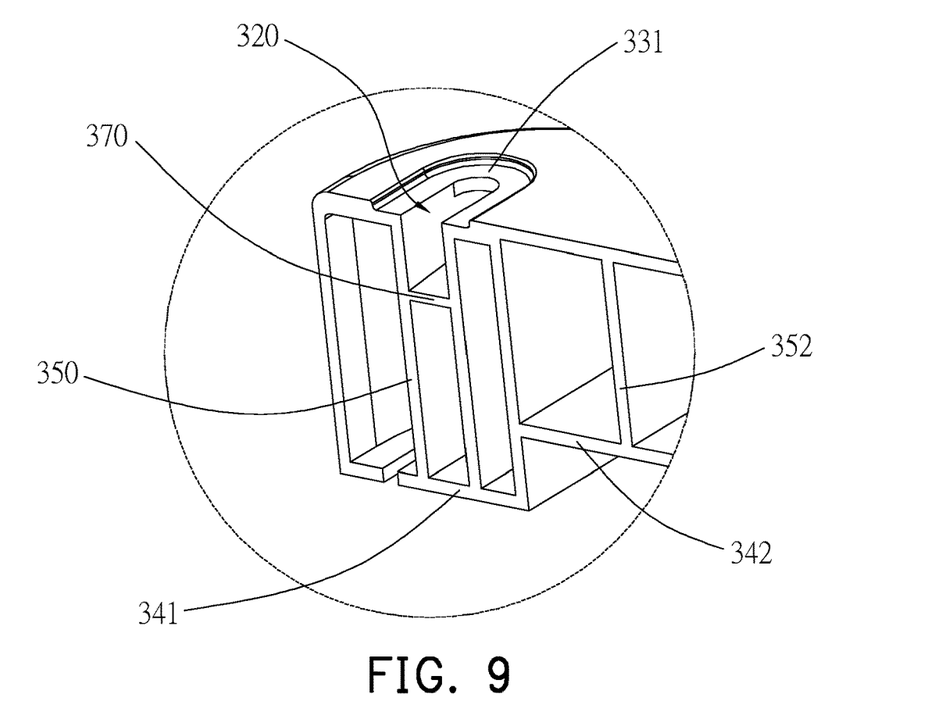
FIG. 9 is an enlargement view of portion B in FIG. 5.
Figure 10:
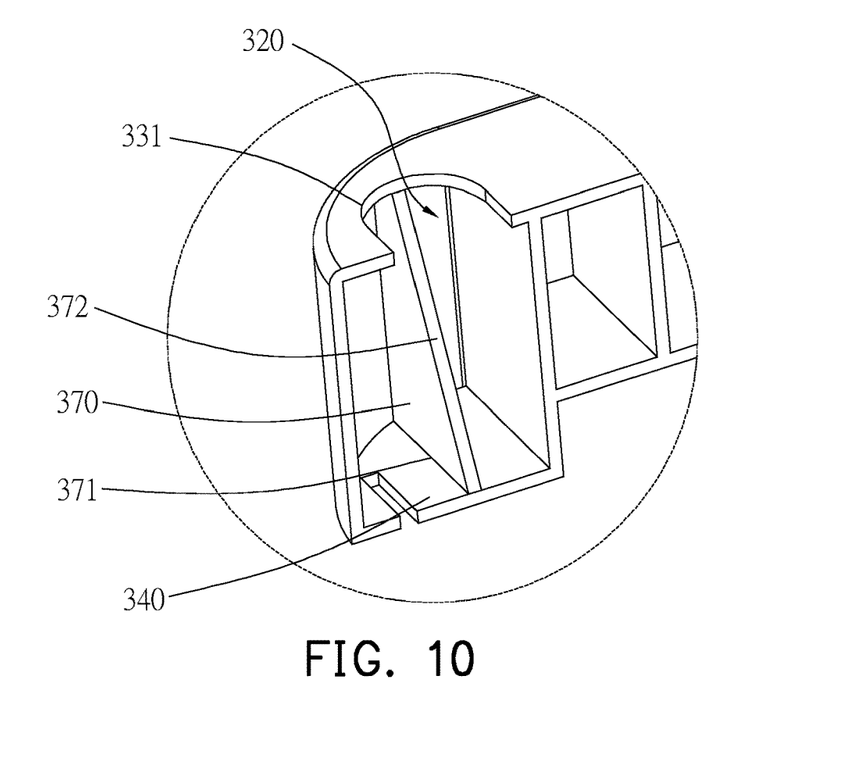
FIG. 10 is an enlargement view of portion C in FIG. 6.
Figure 11:
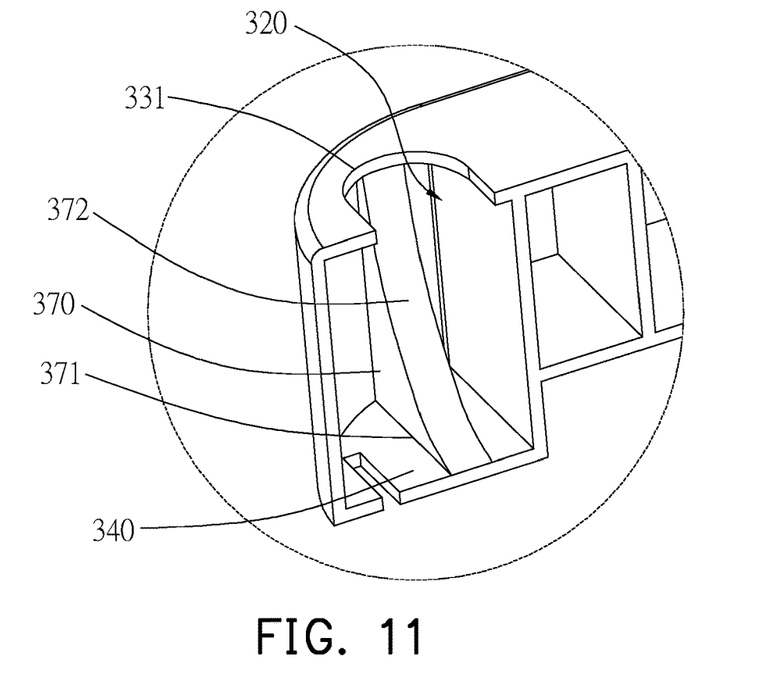
FIG. 11 is an enlargement view of portion D in FIG. 7.

As shown in FIG. 9 to FIG. 11, in some embodiments of the disclosure, the liquid inlet channel 320 is provided with a flow guide 370. The flow guide 370 is configured to guide the electrolyte when liquid injection is performed, so that the electrolyte may smoothly wet the electrode sheets of the cell, liquid injecting may be sped up, and a favorable wetting effect is provided.

Figure 5:
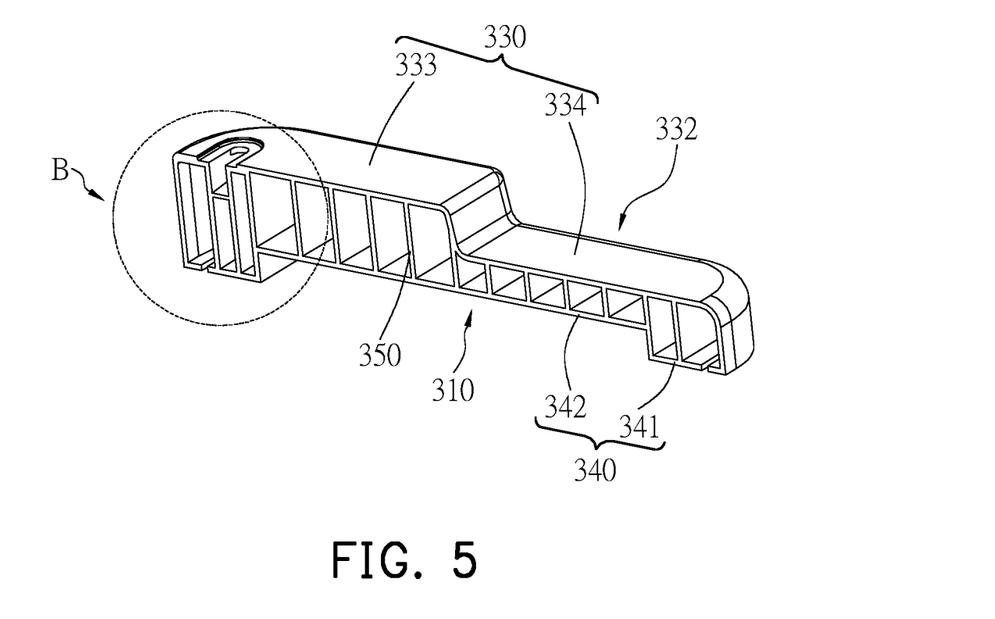
FIG. 5 is a schematic view of a structure of a holder according to an exemplary embodiment of the disclosure.
Figure 6:
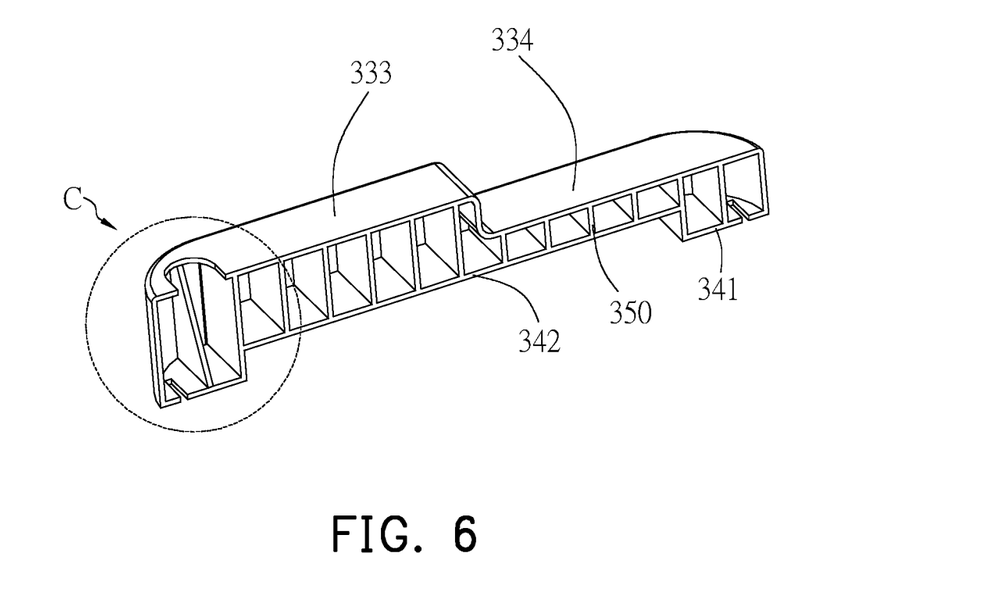
FIG. 6 is a schematic view of the structure of the holder according to another exemplary embodiment of the disclosure.
Figure 7:
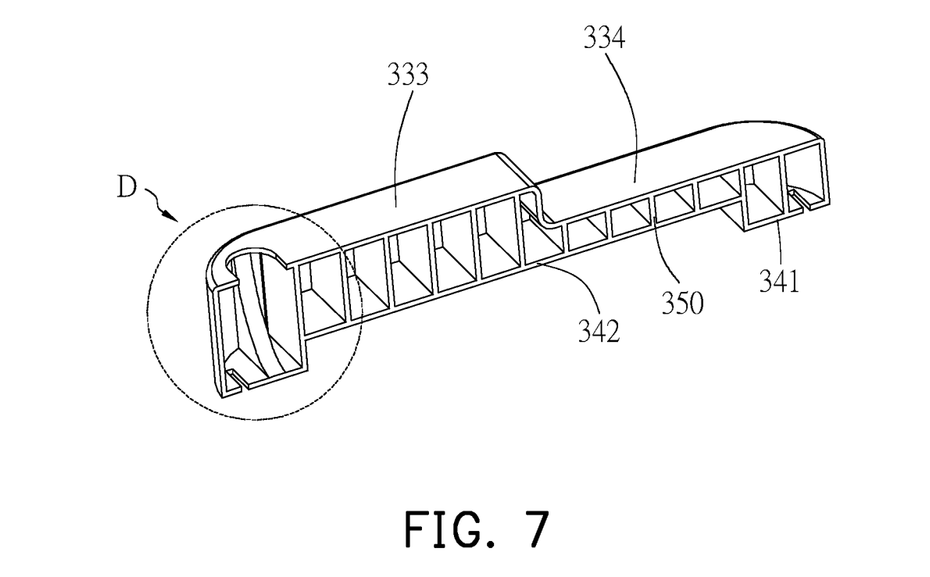
FIG. 7 is a schematic view of the structure of the holder according to still another exemplary embodiment of the disclosure.

As shown in FIG. 5 to FIG. 7, in some embodiments of the disclosure, the holder 300 includes a first connecting plate 330, a second connecting plate 340, and supports 350. The liquid inlet hole 331 is disposed on the first connecting plate 330. The second connecting plate 340 and the first connecting plate 330 are opposite to each other. Note that a structure of the supports 350 is not limited by the disclosure, for example, the supports 350 may be column-shaped or plate-shaped. In some specific embodiments of the disclosure, the supports 350 have a plate-shaped structure, and a number of the supports 350 is multiple. The multiple supports 350 are arranged at intervals and are connected between the first connecting plate 330 and the second connecting plate 340.

In some embodiments, the second connecting plate 340 includes a tab portion accommodating section 342 and support sections 341 located at two ends of the tab portion accommodating section 342. The tab portion accommodating section 342 is recessed towards the first connecting plate 330 and forms a tab portion yielding zone 310. The tab portion yielding zone 310 is configured to accommodate the tab portion. The support sections 341 are configured to support the first surface 101 and the second surface 102 of the housing 100. An orthographic projection of the liquid inlet hole 331 on the second connecting plate 340 is located on the support sections 341.

As shown in FIG. 9 to FIG. 11, in some embodiments of the disclosure, the flow guide 370 is connected between the first connecting plate 330 and the second connecting plate 340. An orthographic projection of the flow guide 370 on the first connecting plate 330 at least partially overlaps the liquid inlet hole 331, so that the electrolyte may enter the cell body 210 along the flow guide 370 after entering the liquid inlet hole 331. In addition, as the orthographic projection of the flow guide 370 on the first connecting plate 330 at least partially overlaps the liquid inlet hole 331, the impact force generated by the electrolyte may be reduced, and the electrode sheets of the cell may be further prevented from being damaged.

As shown in FIG. 10 and FIG. 11, in some embodiments of the disclosure, the flow guide 370 includes a flow guide surface 372, and one end of the flow guide surface 372 close to the second connecting plate 340 is inclined towards the cell body 210. In this way, the electrolyte flows towards the cell body 210 under action of gravity of its own and the impact force generated by liquid injection to complete the wetting of the cell 200 and the entire liquid injection process.

As shown in FIG. 5 and FIG. 9, in some other embodiments of the disclosure, the flow guide 370 is connected between the adjacent two supports 350, and the orthographic projection of the flow guide 370 on the first connecting plate 330 covers the liquid inlet hole 331. Note that the flow guide 370 may be connected between the adjacent two supports 350 in a horizontal state and may also be connected between the adjacent two supports 350 in an inclined state, and connection state is not particularly limited by the disclosure. A shape of the flow guide 370 may also be configured according to actual needs, and in a specific embodiment, the flow guide 370 is a flat plate, and one side surface of the flow guide 370 close to the liquid inlet hole is the flow guide surface 372.

As shown in FIG. 6, FIG. 7, FIG. 10, and FIG. 11, in some other embodiments of the disclosure, the flow guide 370 is connected between the first connecting plate 330 and the second connecting plate 340. The flow guide 370 has the flow guide surface 372. One end of the flow guide surface 372 is connected to the first connecting plate 330, and the other end is connected to the second connecting plate 340. The one end of the flow guide surface 372 connected to the second connecting plate 340 is inclined towards the cell body 210. The flow guide 370 further includes a first connecting surface and a second connecting surface 371. The first connecting surface is connected to the first connecting plate 330, and the second connecting surface 371 is connected to the second connecting plate 340. The first connecting surface and the second connecting surface 371 are opposite to each other, and the flow guide surface 372 is connected to the first connecting surface and an end portion of the second connecting surface 371. In some specific embodiments, the flow guide surface 372 is an inclined surface, and in some other specific embodiments, the flow guide surface 372 is a smoothly curved surface.

As shown in FIG. 4 to FIG. 5, in some embodiments of the disclosure, the first surface 101 and the second surface 102 of the housing 100 are opposite to each other. The first surface 101 is provided with first grooves 140, and the liquid injecting holes 130 are not located in the first grooves 140. The first connecting plate 330 is provided with a second groove 332 matching a shape and size of the corresponding first groove 140. In practical applications, when batteries are combined to form a battery apparatus, the first grooves 140 may be configured to accommodate related components (e.g., electrode posts) on the housing 100 of the adjacent battery 10. The second grooves 332 are configured to be matched with the first grooves 140 to provide spaces for accommodating the electrode posts. In some embodiments of the disclosure, the first connecting plate 330 includes a first section 333 and a second section 334. The liquid inlet hole 331 is disposed on the first section 333, and the second section 334 is recessed to form the second groove 332.

Figure 14:
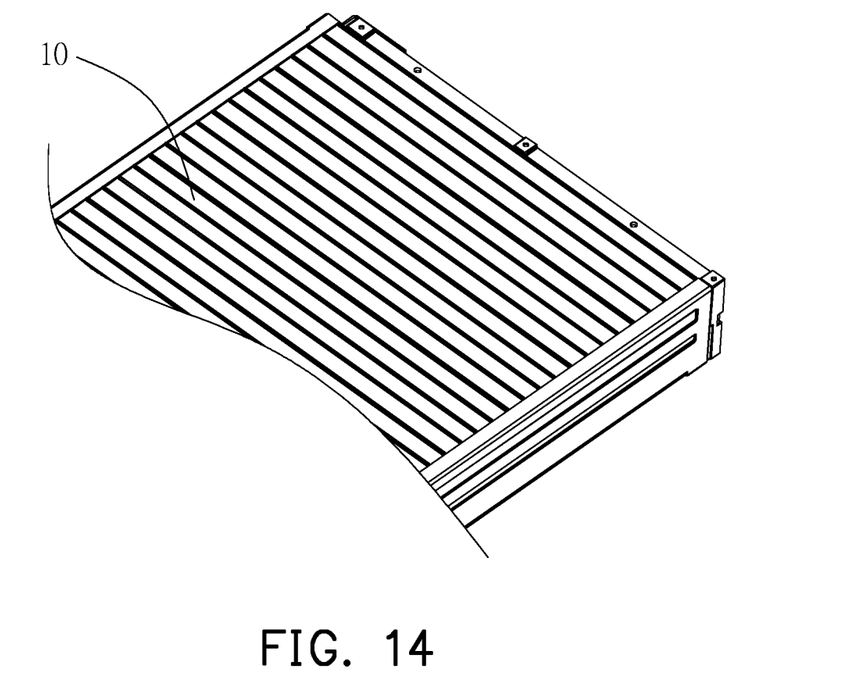
FIG. 14 is a schematic view of a structure of a battery apparatus according to an exemplary embodiment of the disclosure.

As shown in FIG. 14, the disclosure further provides a battery apparatus including at least two of the batteries 10 described in any one of the foregoing embodiments. The battery apparatus may be a battery module or a battery pack. Herein, the battery module includes a plurality of batteries 10, end plates, and side plates. The end plates and the side plates are configured to secure the batteries 10. The battery pack includes a plurality of batteries 10 and a battery box, and the battery box is configured to secure the batteries 10.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
a cell, comprising a cell body and tab portions, wherein the tab portions are extending from opposite sides of the cell body;
a housing, wherein the cell is disposed in the housing, the housing comprises a first surface and a second surface opposite to each other, the first surface is provided with liquid injecting holes, the liquid injecting holes penetrate the first surface and do not penetrate the second surface, and an orthographic projection of the cell body onto the first surface does not overlap the liquid injecting holes; and
holders, disposed in the housing, wherein each of the holders is located on one side of the cell body, wherein the holders support between the first surface and the second surface of the housing and are located between an end side surface of the housing and a tab portion extending surface of the cell body,
wherein each of the holders is provided with a liquid inlet hole and a liquid inlet channel, a projection of the liquid inlet hole on the first surface at least partially overlaps the liquid injecting holes, a portion of each of the holders provided with the liquid inlet hole abuts against the first surface, and one end of the liquid inlet channel communicates with the liquid inlet hole.

2. The battery according to claim 1, wherein a central axis of each of the liquid injecting holes is parallel to a tab portion extending surface of the cell body.

3. The battery according to claim 2, wherein an internal space of the housing comprises a cell body accommodating zone and tab portion accommodating zones, the cell body accommodating zone is configured to accommodate the cell body, the tab portion accommodating zones are configured to accommodate the tab portions, the housing comprises a cell body section and tab portion sections, each of the tab portion sections is located on one side of the cell body section, the cell body section surrounds and forms the cell body accommodating zone, the tab portion sections surround and form the tab portion accommodating zones, and the liquid injecting holes are disposed on the tab portion sections.

4. The battery according to claim 1, wherein the liquid injecting holes are disposed at corners of the first surface, a length of each of first sides forming each of the corners is a, a length of each of second sides forming each of the corners is b, a distance between each of the liquid injecting holes and each of the second sides is h1, a distance between each of the liquid injecting holes and each of the first sides is h2, $a \geq b$, $\frac{1}{600}a \leq h1 \leq \frac{1}{2}a$, and $\frac{1}{100}b \leq h2 \leq \frac{1}{5}b$.

5. The battery according to claim 1, wherein each of the tab portions comprises two or more single tabs extending from a side surface of the cell body, and an overlapping direction of the single tabs is a first direction when the single tabs are flattened in a direction perpendicular to the side surface of the cell body,
wherein the first surface is one of the opposite two surfaces of the housing in the first direction.

6. The battery according to claim 3, wherein each of the tab portions comprises two or more single tabs extending from a side surface of the cell body, and an overlapping direction of the single tabs is a first direction when the single tabs are flattened in a direction perpendicular to the side surface of the cell body,
wherein the first surface is one of the opposite two surfaces of the housing in the first direction.

7. The battery according to claim 4, wherein each of the tab portions comprises two or more single tabs extending from a side surface of the cell body, and an overlapping direction of the single tabs is a first direction when the single tabs are flattened in a direction perpendicular to the side surface of the cell body,
wherein the first surface is one of the opposite two surfaces of the housing in the first direction.

8. The battery according to claim 5, wherein orthographic projections of the single tabs onto the first surface do not overlap the liquid injecting holes.

9. The battery according to claim 6, wherein orthographic projections of the single tabs onto the first surface do not overlap the liquid injecting holes.

10. The battery according to claim 7, wherein orthographic projections of the single tabs onto the first surface do not overlap the liquid injecting holes.

11. The battery according to claim 1, wherein a number of the liquid injecting holes is at least two, and two of the liquid injecting holes are diagonally arranged.

12. The battery according to claim 1, wherein the liquid inlet channel is provided with a flow guide.

13. The battery according to claim 12, wherein each of the holders comprises:
a first connecting plate, wherein the liquid inlet hole is disposed on the first connecting plate;
a second connecting plate, wherein the second connecting plate and the first connecting plate are opposite to each other; and
supports, connected between the first connecting plate and the second connecting plate.

14. The battery according to claim 13, wherein the flow guide is disposed between the first connecting plate and the second connecting plate, and an orthographic projection of the flow guide onto the first connecting plate at least partially overlaps the liquid inlet hole.

15. The battery according to claim 14, wherein the flow guide is connected between the adjacent two supports, and the orthographic projection of the flow guide onto the first connecting plate covers the liquid inlet hole.

16. The battery according to claim 14, wherein the flow guide comprises a flow guide surface, and one end of the flow guide surface close to the second connecting plate is inclined towards the cell body.

17. The battery according to claim 15, wherein the flow guide comprises a flow guide surface, and one end of the flow guide surface close to the second connecting plate is inclined towards the cell body.

18. A battery apparatus, comprising the battery according to claim 1.

* * * * *